United States Patent [19]

Laing

[11] 4,108,077

[45] Aug. 22, 1978

[54] RAIL VEHICLES WITH PROPULSION ENERGY RECOVERY SYSTEM

[76] Inventor: Nikolaus Laing, Hofener Weg 35 bis 37, 7141 Aldingen bei Stuttgart, Fed. Rep. of Germany

[21] Appl. No.: 585,366

[22] Filed: Jun. 9, 1975

[30] Foreign Application Priority Data

Jun. 7, 1974 [AT] Austria .................................. 4720/74
Aug. 6, 1974 [AT] Austria .................................. 6411/74

[51] Int. Cl.² ............................................. B61B 13/12
[52] U.S. Cl. ................................ 104/156; 104/23 FS; 104/154; 105/148; 180/65 DD; 243/6
[58] Field of Search ................... 104/23 FS, 134, 138, 104/147 R, 154, 155, 156, 165, 148 MS, 148 LM; 243/6; 302/14, 31; 180/7 R, 65 R, 66 S, 65 DD; 105/148, 37, 41, 231, 236

[56] References Cited

U.S. PATENT DOCUMENTS

| 425,408 | 4/1890 | Craw ................................ 104/23 FS |
| 463,109 | 11/1891 | Devinney et al. ................ 105/236 |
| 723,727 | 3/1903 | Pfeil .................................... 180/65 R |
| 1,719,231 | 7/1929 | McLaren ............................ 104/156 |
| 2,511,979 | 6/1950 | Goddard ............................ 104/138 R |
| 2,534,453 | 12/1950 | Kantola .............................. 105/236 |
| 3,438,337 | 4/1969 | Edwards ............................ 104/138 R |
| 3,565,011 | 2/1971 | Edwards ............................ 104/138 R |
| 3,566,800 | 3/1971 | Chuan ................................ 104/138 R |
| 3,605,629 | 9/1971 | Edwards ............................ 104/138 R |
| 3,799,061 | 3/1974 | Bertin ................................ 104/23 FS |
| 3,888,434 | 6/1975 | Chersky et al. .................. 104/138 R |

FOREIGN PATENT DOCUMENTS

289,040 8/1971 U.S.S.R. ............................ 104/138 R

Primary Examiner—Drayton E. Hoffman
Assistant Examiner—Carl Rowold
Attorney, Agent, or Firm—Pennie & Edmonds

[57] ABSTRACT

A rail vehicle including means for converting energy released during braking of the vehicle to a stored potential energy which may be subsequently used to impart acceleration to the vehicle. Pressure accumulators are utilized where the accumulators include a gas which is compressed by braking forces and where the heat of the compressed gas is stored in latent heat storage elements contained within the accumulators. The track upon which the vehicle rides comprises a hermetically closed tubular chamber enclosing the vehicle and which is filled with water vapor to reduce drag on the vehicle.

A method of propelling a rail vehicle including the steps of recovering the brake energy produced during braking to a stop, storing this energy and then using the energy to accelerate the vehicle from the stop.

7 Claims, 21 Drawing Figures

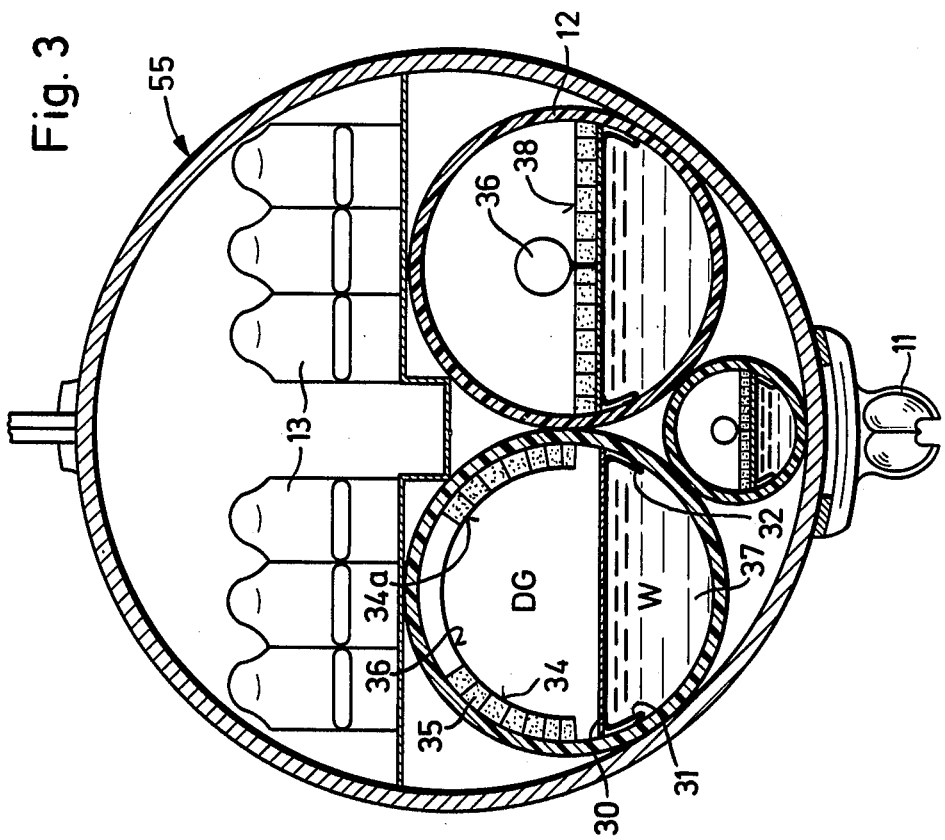

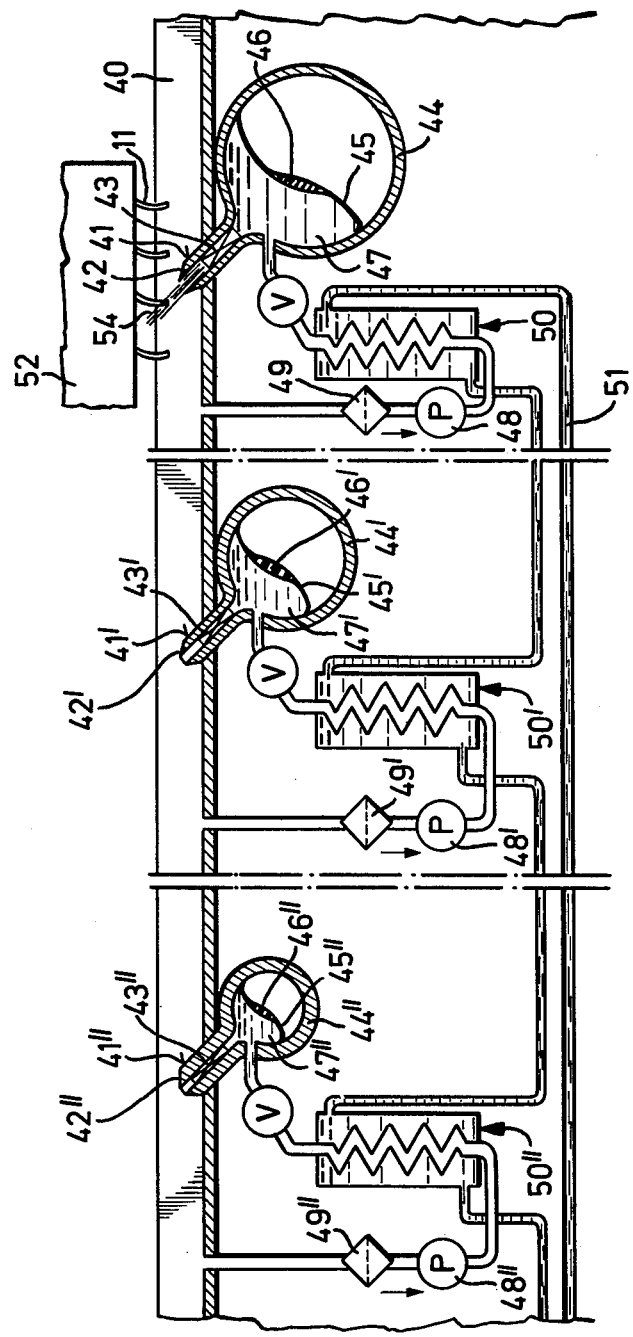

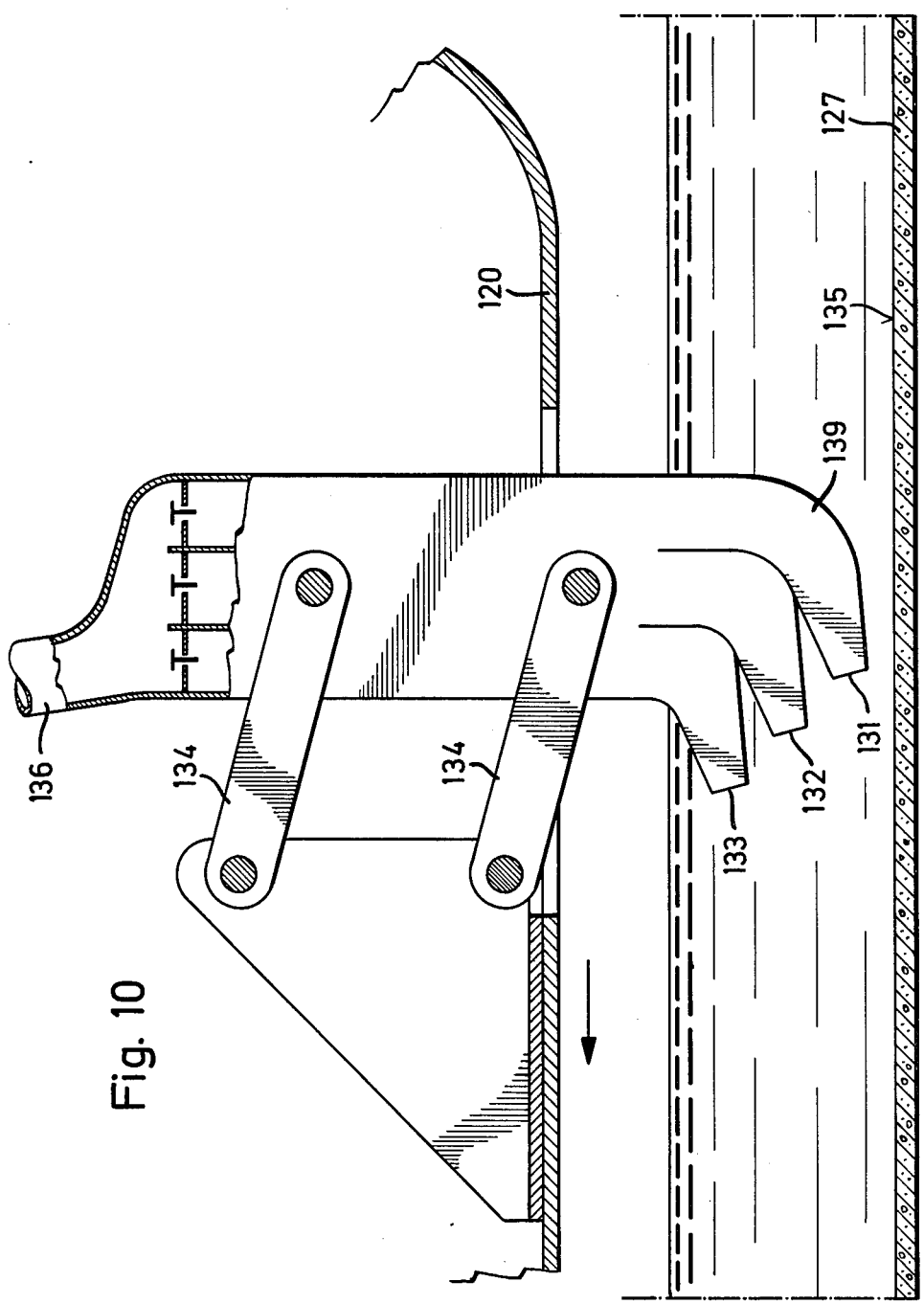

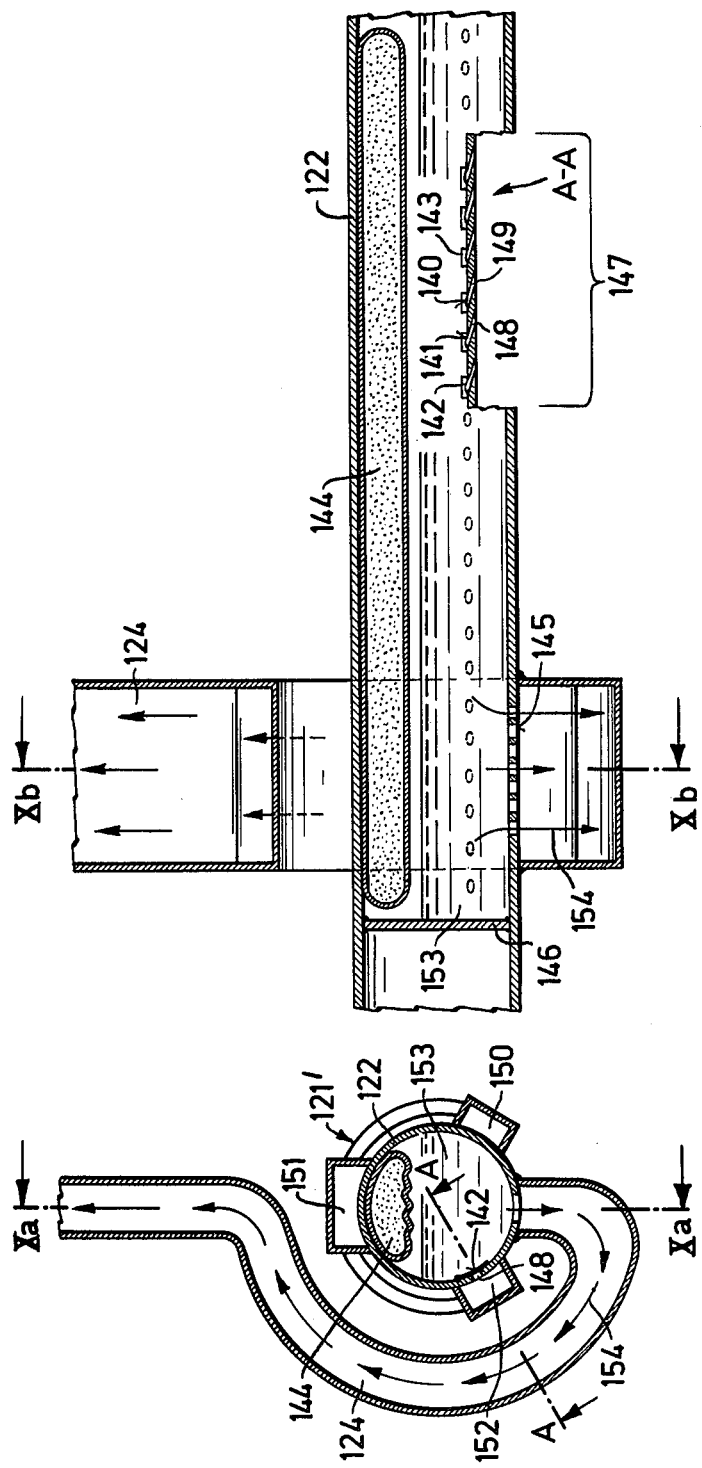

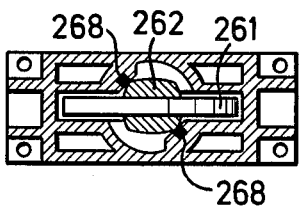
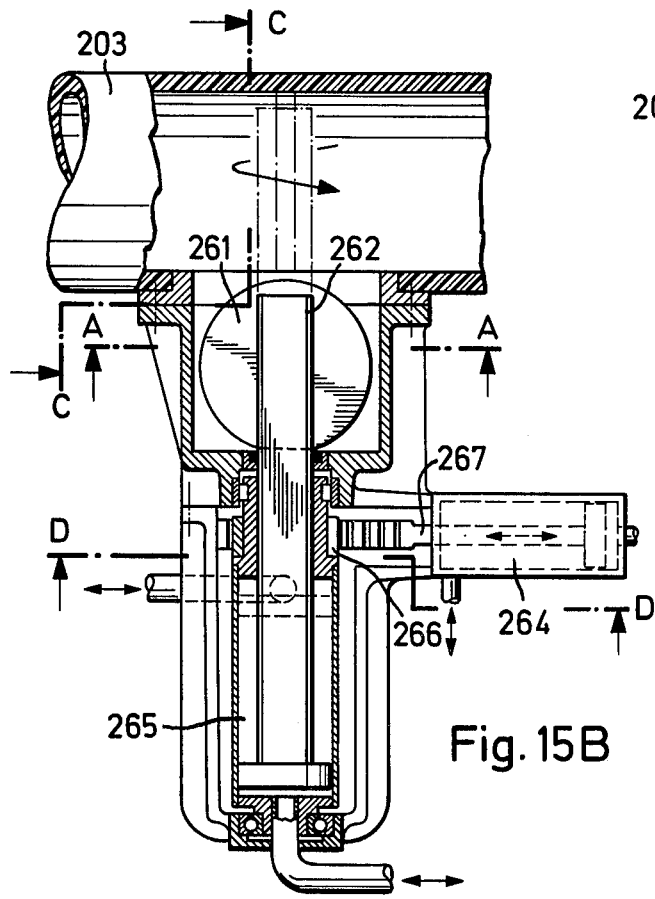
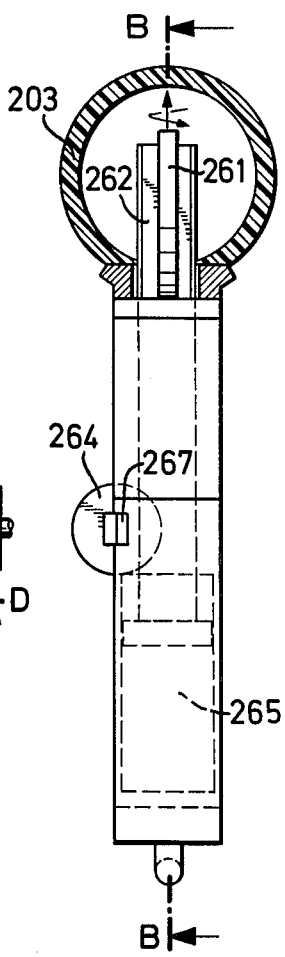
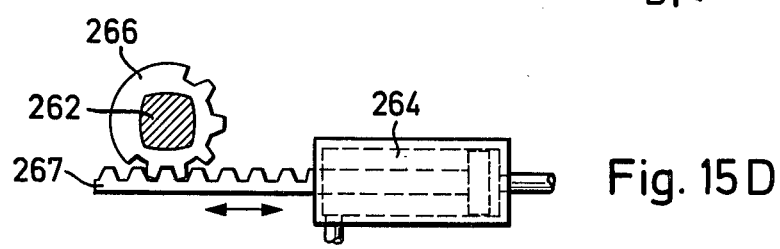
Fig. 15A
Fig. 15C
Fig. 15B
Fig. 15D

RAIL VEHICLES WITH PROPULSION ENERGY RECOVERY SYSTEM

THE PRIOR ART

Aircraft catapults are known which provide the entire acceleration energy for the aircraft by a stationary starting apparatus. Rail systems operated inside track tubes are known from which the air is evacuated and which are filled with water vapour and where the propulsion for a rail vehicle is provided by linear electric motors. Furthermore, rail vehicles are known which are held without contact and at a distance from supporting rails by the forces of electronically controlled magnetic systems. Finally, rail vehicles are known in which skid shoes are lifted from the rails by a compressed air cushion. None of these transport systems operates satisfactorily in the technological or economic sense. This is because catapults produce unacceptable accelerations, linear electric motors require extremely high investment, magnetic suspensions demand large continuous electrical power and tracked railways of the hovercraft type consume large pneumatic pumping power and cause extreme noise generation and dust formation.

THE OBJECT OF THE INVENTION

The invention has the aim of providing a high-speed transport system by which, without the capital investment of known rail systems, high speeds and traffic performances can be achieved.

DESCRIPTION OF THE INVENTION

The system according to the invention is distinguished by stationary propulsion apparatus arranged outside the vehicle which imparts kinetic energy to the vehicle and by an energy converter arranged in the vehicle, which converts most of the braking energy released in deceleration of the vehicle into a form of energy which can be stored and is suitable for supplying propulsion devices situated in the vehicle. As a preferred embodiment the invention provides hydrostatic linear bearings on which the vehicle slides along guide rails arranged underneath or, preferably, above the vehicle.

The invention is furthermore concerned with a sealing system by which the unavoidable leakage loss of hydrostatic bearings is reduced to a minimum. This sealing system is similar, at least over part of the circumference of the bearing surfaces, to a hydrodynamic bearing wherein pressure is built up by shear stresses.

A vehicle according to the invention can be operated in free air. However, the preferred embodiment consists of an arrangement wherein the track is enclosed in a tube. According to the invention, saturated or superheated water vapour is preferred inside the tube instead of rarefied air.

The braking of the vehicle can be accomplished by means of scooptype diffusers which are lowered into a water trough. The entry apertures of these scoops are sunk below the liquid level in the water trough. The water collected under ram pressure in the lowered scoop is stored in a pressure container. The mass of water fed into the container exerts a braking momentum upon the vehicle and almost the entire kinetic energy of the moving vehicle can be recovered if scoops of different entry sizes having sufficiently fine steps between them are deployed successively.

The invention is also concerned with a method for the operation of high-speed transport vehicles. This method is based on the recognition that the kinetic energy of a moving vehicle increases with its square of the speed. Thus, a vehicle speed of 1000 km/h corresponds to a kinetic energy which is equal to the potential energy of an altitude difference of 4000 m.

The invention, therefore, provides that kinetic energy is imparted to the vehicle by stationary propulsive machinery only during the starting process and, wholly or largely, the vehicle travels to the next stop without any help from its own propulsion apparatus. Before the next stop, the substantial kinetic energy still remaining is recovered by regenerative braking to be deployed for fresh acceleration in the next stage. This method of propulsion is conditional on extremely low drag forces between the rail and the vehicle, on the one hand, and between the surrounding atmosphere and the vehicle, on the other.

According to the invention, the densitiy of the atmosphere can be held down by using vapour as a filling medium in hermetic sealed track tubes instead of air.

In terms of energy transformations, the invention resides in the following sequence of operations:

1. During the starting phase, the vehicle is accelerated by hydraulic machinery performing the function of a linear motor, which may be regarded as the linear equivalent of the Pelton turbine, wherein distributed stationary water jets have discharge velocities which increase along the path of travel with increasing vehicle speed. To maintain optimum propulsion efficiency the jet velocity is equal to about twice the travelling speed vehicle.

2. During the starting phase, the pressure accumulators are discharged either wholly or partly by expelling the water accumulated during regenerative braking to generate a propulsive thrust.

3. Owing to a favourable weight drag ratio, the travelling speed of the vehicle diminishes insignificantly during its journey. However, the speed can also be maintained at a constant value by expelling water through jets from the vehicle during the entire journey.

4a. Insofar as the water-accelerating propulsive machinery generates heat, this is imparted to the emerging water. In order to maintain a low temperature inside the track tube, the water temperature of the stored water is held low.

4b. In order to store water under pressure, a cushion of gas, e.g. hydrogen, is compressed within the pressure accumulator. The heat of compression of the gas is fed to a latent heat accumulator.

5. A circulation loop independent of the propulsion water system provides water under pressure to the hydrostatic bearings supporting the vehicle.

6a. Braking is accomplished by a linear generator, the inversion of a linear motor in energy terms. The braking energy is fed to an energy accumulator in the vehicle and, after the next re-acceleration, serves for providing propulsive power to a water propulsion jet.

6b. Alternatively, scoop-type diffusers are lowered during the braking phase into a water trough and compressed gas loaded accumulators are charged with water under pressure from the diffusers according to clause 4b. This energy is then available for the next starting and journey phases of the vehicle.

7. The atmosphere in the track tube consists of saturated or superheated water vapour at a preferable average annual soil temperature e.g. about 16° C; and equal to a pressure of 0.018 bar. The aerodynamic drag of the vehicle thus drops by a factor of about 100 compared with the drag power of aircraft having the same traffic capacity and speed. Owing to the higher sonic speed of the saturated or superheated water vapour, travelling speeds of up to 1000 km/h are possible.

A further alternative embodiment of the invention provides accumulators for the braking energy which are arranged not inside the vehicle but in a stationary system. According to this form of the invention the track is a hollow tube and has a plurality of openings controlled by check valves. These openings are supplied with pressure water through a skid shoe. The water penetrates in the tube and the check valve prevents a back flow of the water. The tube is connected with the pressure tank.

In a further embodiment according to the invention, the guide rail in the system is formed as a tube, or else a tube is arranged in parallel with the guide rail. The tubular rail is surrounded by a pair of pincers which are movably supported on the tubular rail either via rolls or, more advantageously, via hydrostatic bearings. A piston is situated inside the tubular rail. The piston is moved by the pressure of compressed air and entrains the sleeve enveloping it, which carries magnets. The supply with compressed air is provided advantageously from a pressure accumulator. During the braking, the kinetic energy of the vehicle is converted by the same piston into a pressure of the air column situated in the tubular rail in front of the vehicle in the direction of travel. In this way, the energy is almost completely recovered. In the gas space of the pressure accumulator, a thermal accumulator system is preferably suited containing latent heat absorbing accumulator bodies of large surface area. In this way, energy storage by the absorption of compression heat takes place almost isothermally and thus with low losses. This system is also advantageous in general terms for storing pressure fluid.

The invention shall be explained with the help of figures.

FIG. 3 shows a cross-section through the vehicle cabin of a high-speed railway according to the invention.

FIG. 4 shows, in a diagrammatic illustration, starting apparatus for the high-speed railway according to the invention.

FIG. 10 shows an enlarged view of a tubular scoop.

FIG. 10a shows a vertical cross-section through a guide rail along the section line Xa—Xa in FIG. 10b.

FIG. 10b shows a cross-section through the skid shoe and the guide rail along the section line Xa—Xa in FIG. 10a of a vehicle according to the invention.

FIGS. 15A – 15 show the design of the shut off gate valve in the guide rail in different cross-sections.

Figure 1:
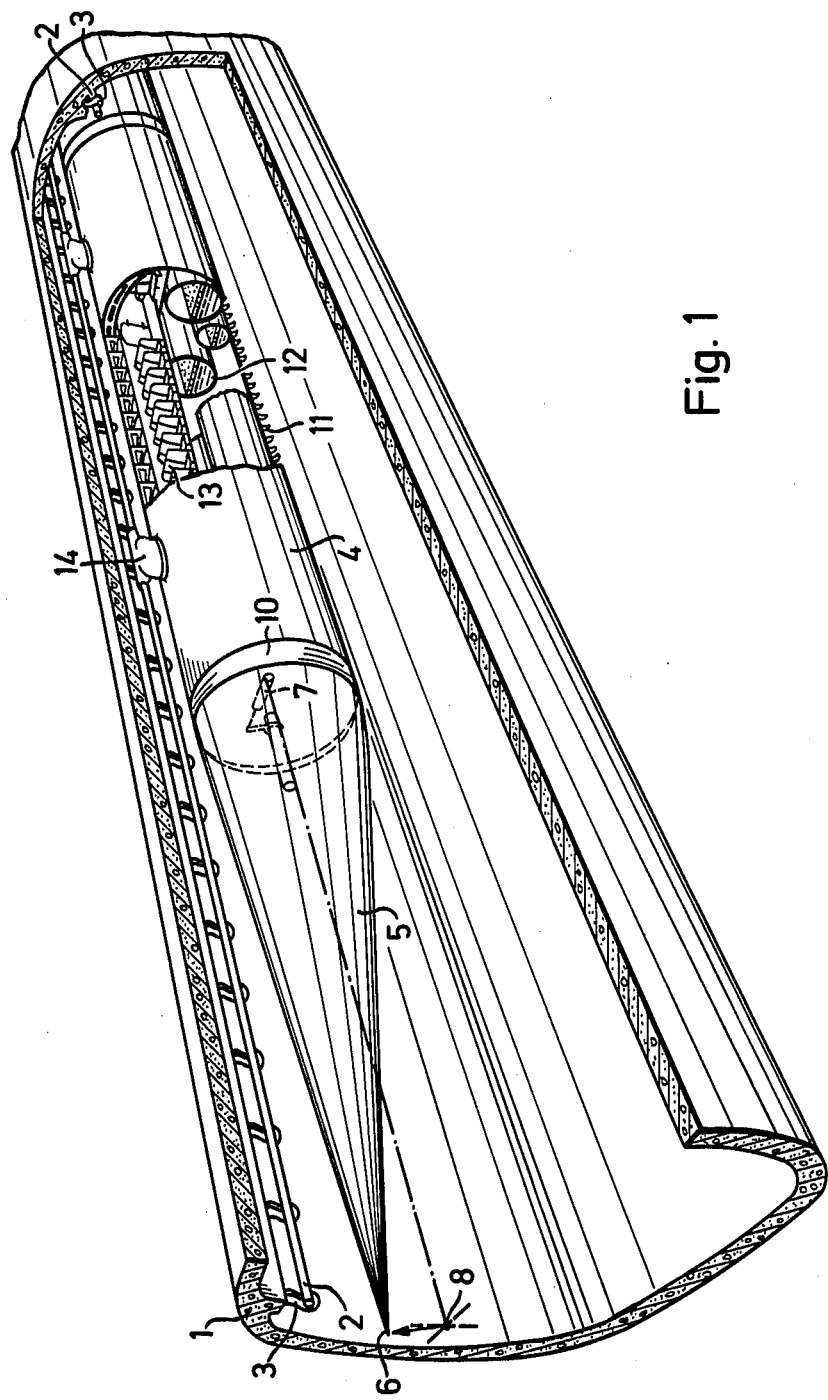
FIG. 1 shows in a perspective cut-out view of a track tube with a vehicle forming part of a high-speed railway according to the invention as seen from the nose cone end.

FIG. 1 shows a vehicle according to the invention in a track tube 1. The cross-section of the track tube is preferably a circle flattened underneath. Near the top of the track tube, two tubular guide rails 2 are suspended alongside each other by hooks 3. The vehicle front cabin 4 is provided with a nose cone 5, the apex 6 of which can be swivelled by servo-control devices 7, towards the wall so far from the vehicle axis 8 that local supersonic regions do not occur. Crowned rings 10 are arranged between the cabins as well as between the cabin and the nose body which allow angular freedom when travelling along curves and in swivelling the nose and tail cones. Pelton buckets 11 (see also FIG. 3) are arranged underneath the cabins. Pressure containers 12 and seating accomodation 13 are arranged in the cabin. Suspension bearings 14 surround the guide rail 2.

During the operation of the railway, the track tube is filled with saturated water vapour at a pressure of about 0.018 bar. The corresponding saturation temperature track of 16° C is equal to the average annual soil temperature. In sandy soil, the track tube is laid about 1.3 m underneath the ground surface. If laid above ground, the track tube is thermally insulated. Saturated water vapour has a sonic speed of 422 m/s, which is about 25% above that of air. By contrast with air, therefore, a travelling speed of up to 1000 km/h is possible without significant compressibility effects.

The energy required to accelerate the vehicle is provided by stationary propulsion machinery. Since the drag power rises as the third power of the travelling speed, economic operation can only proceed in a rarefied atmosphere, i.e. in a track tube. Each tubular guide rail is surrounded by skid shoes which support the suspension hydrostatically. A new working principle underlies the skid shoe which allows non-contact operation with extremely low rail drag. The weight/drag ratio of the vehicle is of the order of 300. The kinetic energy corresponding to a vehicle travelling at a speed of 1000 km/h is equal to the potential energy of an altitude difference of 4000 m. Under the assumed conditions, a vehicle based on these principles accelerated to 1000 km/h, can travel without additional propulsion over a distance of 1.200 km before most of the acceleration energy is consumed.

In practice, however, owing to the much lower average distances between stations only a small portion of the kinetic energy is used up to overcome the travelling drag so that a braking process is started when the major portion of the starting energy is still available. The braking is performed as regenerative braking so that the braking energy is largely available for fresh acceleration.

This basic principle, namely feeding the acceleration energy via stationary propulsion machinery and the recovery of the residual kinetic energy by regenerative braking can be implemented by a variety of methods. The optimum method has been found to be the conversion of the braking energy into pressure energy and the simultaneous feeding of the compression heat into latent heat accumulators.

Figure 2:
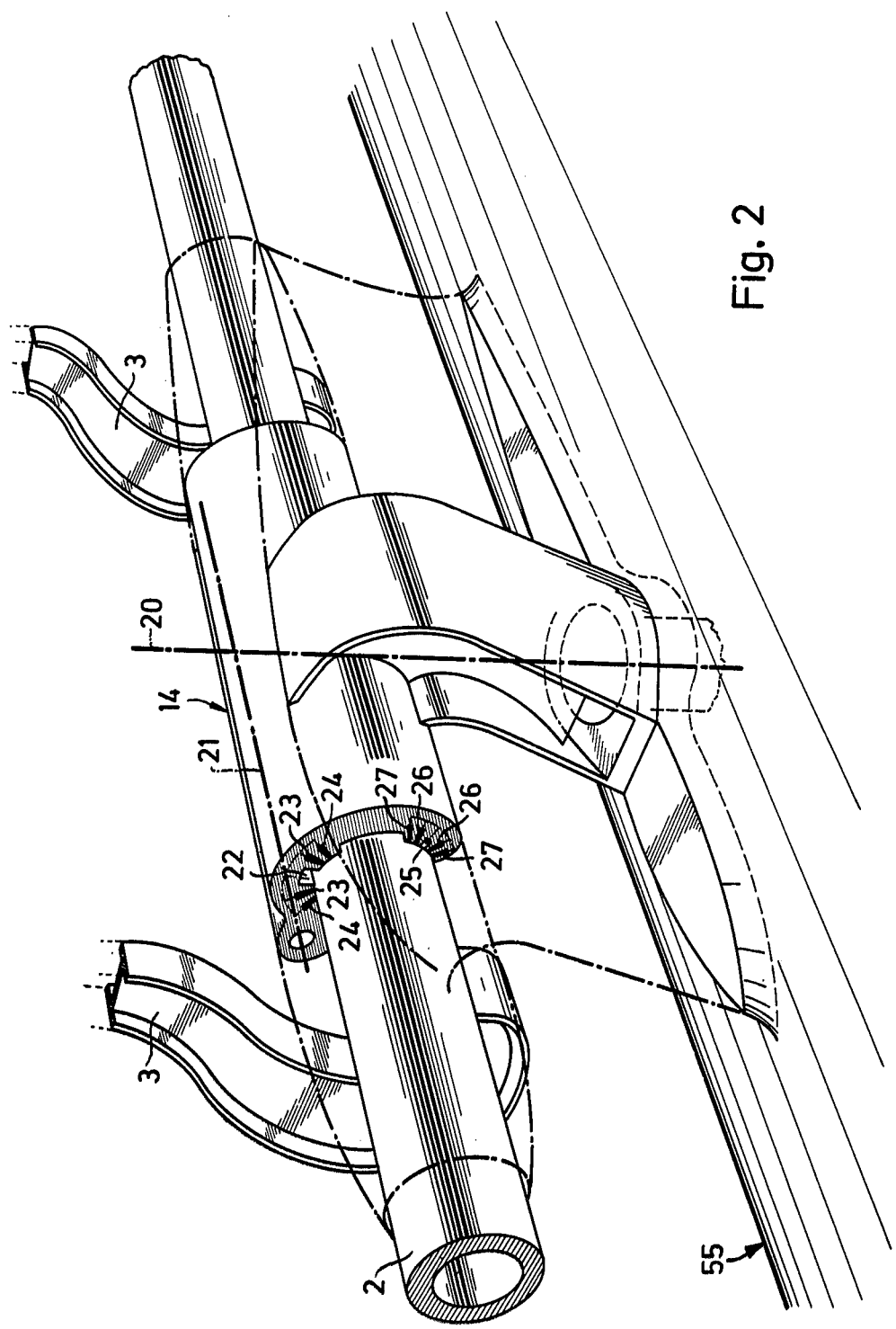
FIG. 2 shows in a perspective cut-out view a plain suspension sliding bearing according to the invention.

FIG. 2 shows a suspension bearing which can be swivelled about the vertical axis 20 and which consists of two components rotatable about the longitudinal axis 21. The portion concealed by the guide rail 2 is only swung into position when the vehicle is lifted off the rail. A chamber 22 is supplied with water by a pressure pump via pressure pipelines and is sealed in front, in the rear and laterally by the sealing strips 23 and 24. Chambers 25 are also supplied with water and are provided with sealing strips positioned such that the chambers are much more narrow in the circumferential direction than chamber 22 since they serve purely for guidance and not for suspension. In operation, it is advantageous if the leakage flows from the chamber are maintained so small that the temperature of the amounts of water enclosed in the chambers 22 and 25 is increased to a level near the boiling point corresponding to the respective working pressure. The sealing strips 23, 24 and 27 have grooves, of a depth of only a few microns, extending from the inside to the outside almost parallel to the direction of travel. A pressure, increasing towards the inside, is built up in these grooves as a function of the distance between the sealing strip and the tubular guide rail 2 and of the travelling speed. By correct dimensioning, this pressure should reach approximately the magnitude of the internal pressure.

FIG. 3 shows a cross-section through a vehicle cabin. The pressure containers 12, preferably constructed of mineral fibre-reinforced synthetic material, have intermediate floors 30, under which rolling diaphragms 31 are arranged such that the rolling axes of the diaphragms are parallel to the container axis. The rolling diaphragms separate the compressed gas space DG from the water space W. Containers 34, permeable to gas, are arranged along the wall. A large number of hollow bodies 35 are situated in the containers 34 and are filled with a substance which acts as a latent heat accumulator. Barium hydroxide octahydrate has been found especially suitable. The containers 34 and 34a are interconnected by a membrane 36. When water 37 is expelled from the pressure containers, containers 34 drop, the compressed gas, e.g. hydrogen, thereby enters into heat exchange with the hollow bodies filled with latent heat storage substances and so charges the storage substances. The final situation is reached as shown by position 38, where the membrane 36 has become formed into a cylinder.

Owing to the low density of saturated water vapour, the aerodynamic drag of the fuselage is extremely low. With a drag coefficient of $C_o = 0.05$, the aerodynamic drag power at 750 km/h amounts to 600 kW. This value is 1.5% of the power expended by two transport aircraft having the same combined payload and the same speed at 3500 m altitude (short range flight level). The drag power of the non-contact bearing elements at the same speed amounts to about 740 kW. Thus, the total drag power drops to 3.3% of that of an aircraft at the same speed.

Underneath the fuselage, Pelton buckets 11 are distributed along the entire fuselage length. They are insulated against the transmission of noise into the cabin. Starting at the station, Pelton nozzles are distributed in the direction of travel over about 7 km. The spacing increases with increasing distance from the station and the nozzle discharge cross-sections diminish so that the discharge velocities increase. At the end of the row of nozzles, the distance between successive nozzles is about the same as the length of the cylindrical fuselage portion of the shortest train unit (about 100 m with three cabins).

These nozzles are supplied with water under pressure from compressed gas energy accumulators in which the water is separated from the compressed gas by diaphragms. The emerging water mass is determined at each point by the period of transit of the accelerating vehicle, the discharge velocity of the jet and the discharge cross-section. The aim is to so increase the acceleration of the vehicle and then reduce it again so that variations of the acceleration are not felt to be disturbing. The energy imparted during the start to a vehicle of about 300 tons weight to each a final speed of 750 km/h amounts to 1,820 kWh. The energy required to accelerate the water by the compressed air accumulators arranged at the station is supplied by pumps which force the water after the completion of a start through filters back into the pressure water tanks of the pressure accumulators. The vehicle range, without loss of speed, amounts to about 350 km. The smaller the distance to the next station, the larger is the energy which the vehicle accumulates from braking, to be described in the next paragraph, and which is available for acceleration of the vehicle in subsequent stacts. For short ranges, the largest portion of the starting acceleration energy is supplied by this vehicle accumulator.

If the journey distance is to be larger than 350 km, then additional momentum is to be imparted to the vehicle on traversing a station. In this case, only the Pelton nozzle group furthest along the starting installation is used. In order to maintain a travelling speed of 750 km/h over a range beyond 350 km, it is necessary to provide a re-acceleration to 820 km/h.

FIG. 4 shows diagrammatically a starting apparatus. The lower wall of the track tube 40 is traversed by pipelines 41. These pipelines terminate in nozzles 42 and have rapid response shut off valves 43. The pipelines communicate with high pressure containers 44 in which membranes 45 with a reinforced central region 46 are arranged. Filtered water is pressed into the spaces 47 by pressure pumps 48 via the filters 49. The heat loss is rejected via heat exchangers 50 to a starting water circuit 51. During the traverse of the vehicle 52, the buckets 11 are impinged upon by the jets 54. The rapid response shut-off valves 43 open in each case only when the transit of the vehicle is imminent.

A water trough is arranged at the bottom of the track over a length of about 12 km ahead of the station. Containers are situated in the fuselage of every self-contained vehicle unit. Each of these containers is separated by a thin heat-insulating diaphragm into a compressed gas space and a water space. One pipeline each leads to each of these containers. The pipeline terminates in a scoop-type diffuser capable of being lowered into the water trough. The water is conveyed from the scoop into the container. Heat is released during the compession of the compressed gas cushion. This heat is fed to the latent heat accumulator also housed in the container. The inlet cross-sections of the scoop-type diffusers are of different size in order to achieve in braking with all the scoops the same mean deceleration during the entire filling-up time. The pressure inside the container filled at first amounts to about 185 bar. In the subsequent containers, a pressure of about 150 or 130 bar is reached. By this method, the braking energy is recovered and stored with an extremely high efficiency for the subsequent start and the whole journey. Scoop-type diffusers with different inlet cross-sections are arranged to swivel in such a manner that they can be lowered into the water trough along the braking path. The high-speed region and correspondingly, the high-pressure accumulator is correlated to the scoop with the smallest inlet cross-section.

Figure 5A:
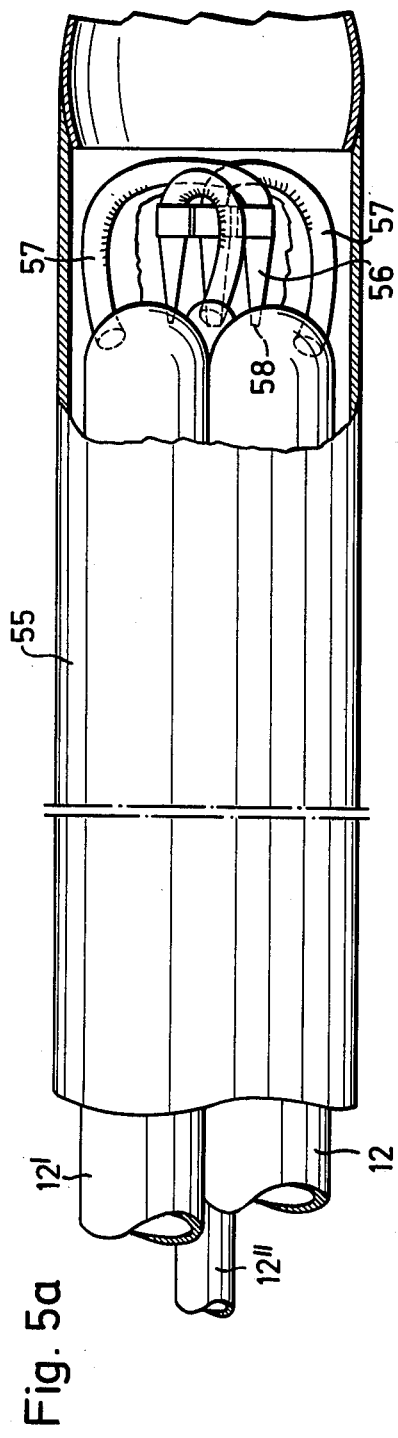
FIGS. 5a and 5b show, in diagrammatic illustrations, the arrangement of the scoop-type diffusers of a braking system according to the invention.
Figure 5B:
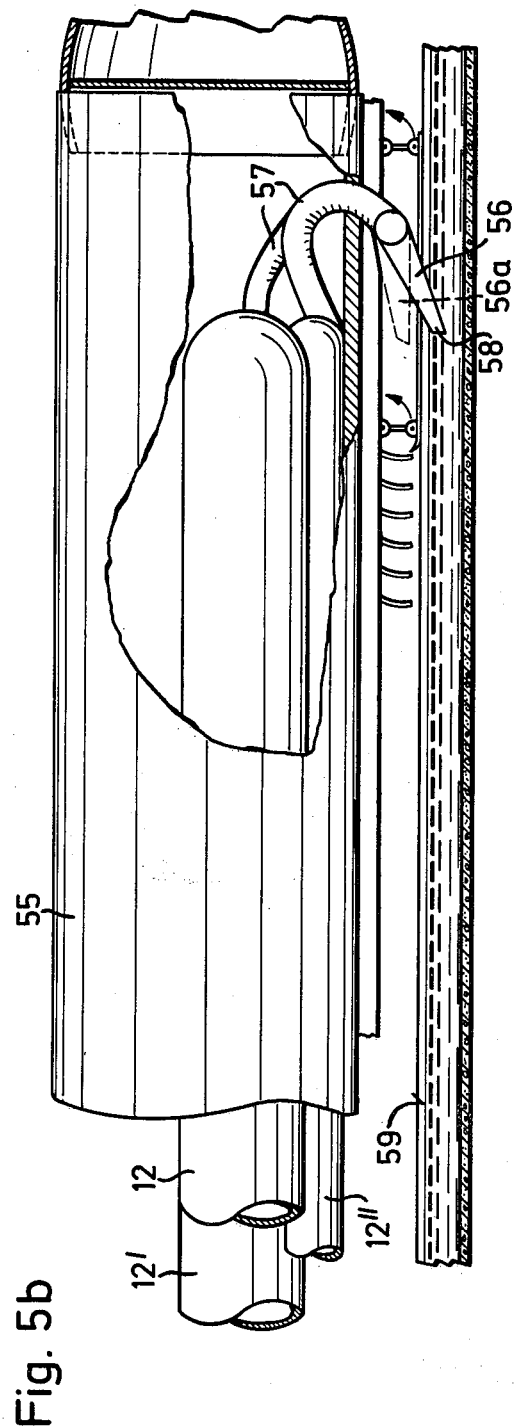

FIGS. 5a and 5b show the containers 12 in the vehicle cabin 55, each of which is permanently connected to one scoop-type diffuser unit 56 by communicate, via flexible hose 57, with an inlet aperture 58. In order to brake, the scoop diffuser is swivelled out of the position 56, shown in broken line, into the position shown in full line so that the inlet aperture 58 protrudes below the water level 59. Scoops with varying inlet apertures 58 are then engaged one by one and thus fill the containers 12, 12' etc. one by one.

The storage accumulators arranged in the vehicle are charged during the braking process with recovered braking energy. A thrust of 620 kp is required during the journey at constant speed to overcome the aerodynamic and bearing drags. At a maximum rocket propulsion efficiency of unity, the nozzle outlet velocity is exactly as large as the travelling velocity and corresponds to a water pressure of 220 atmospheres gauge, hence approximately to the pressure in the first accumulator container. During the discharge of the pressure containers, the heat energy stored in the latent heat accumulator during the braking process is released almost without loss so that the compression as well as the expansion processes proceed nearly isothermally. Thus, the propulsion efficiency is higher than the overall propulsion efficiency in any known propulsion system. For an aircraft of the same speed, the overall propulsion efficiency amounts, by comparison to 23%. A further advantage of rocket propulsion is the practically noiseless operation. Noise felt by the passenger is generated only during the acceleration and deceleration phases. Jet nozzles with different outlet cross-sections are arranged in the tail cone. The nozzle with the largest cross-section contributes to the acceleration during the start, whilst the other two nozzles generate the thrust in crusing when first, the medium-pressure accumulator, and only then, via the smallest nozzle, the high-pressure accumulator is emptied.

Figure 6:
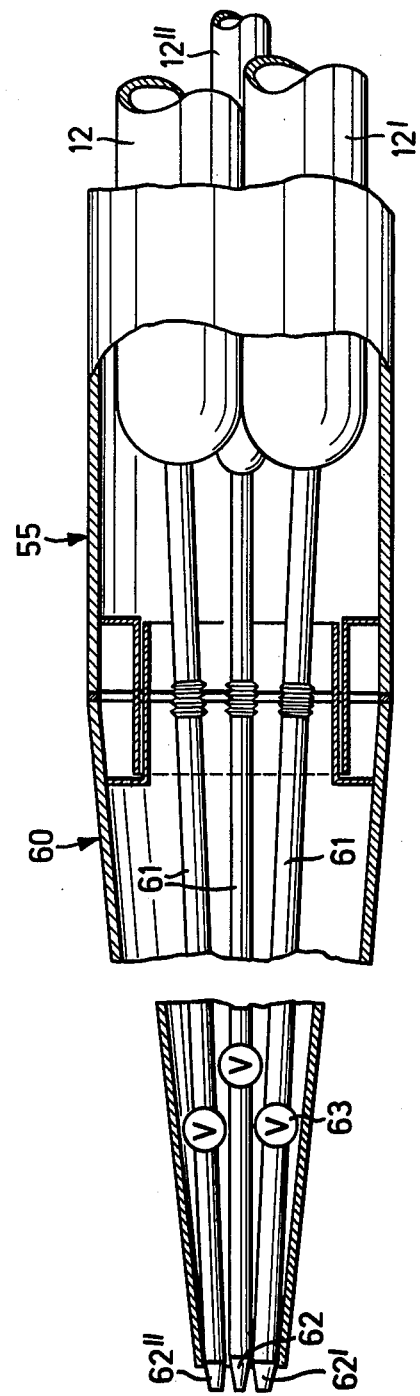
FIG. 6 shows in a partial cut-out view, a propulsive nozzle attached to the vehicle.

FIG. 6 shows the tail cone region with the tail cone 60 and the pipeline 61 feeding the nozzle 62. First the low-pressure container and subsequently the high-pressure container is discharged during the starting process by manipulating valve 63, whereby a portion of the braking energy is recovered.

Figure 7:
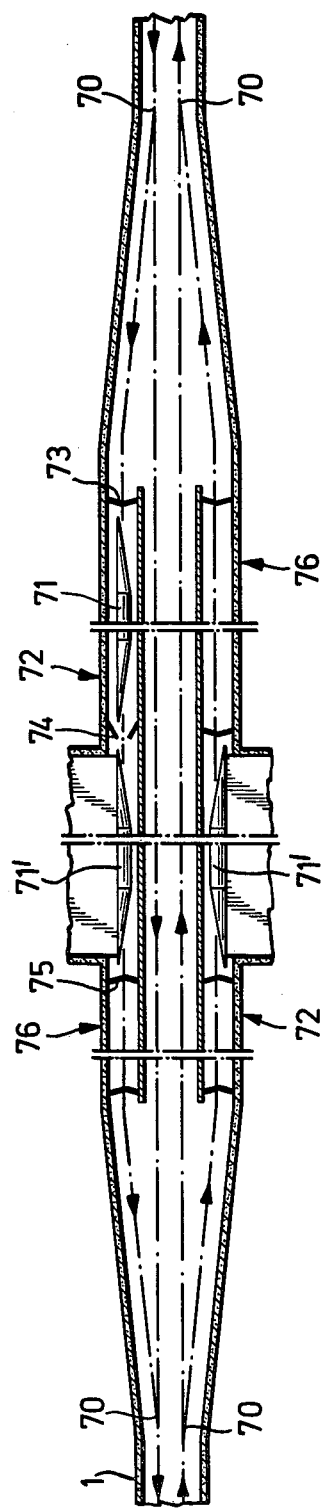
FIG. 7 shows, in a diagrammatic cross-section a station stop formed as a vacuum lack for a high-speed railway according to the invention.

FIG. 7 shows a stopping station. The train 71 is shunted by means of switch points 70 into a lock 72 which is evacuated before opening the lock gate 73. After flooding with air, the lock gate 74 is opened and the vehicle 71' enters the free air space to enable boarding and alighting.

Figure 8:
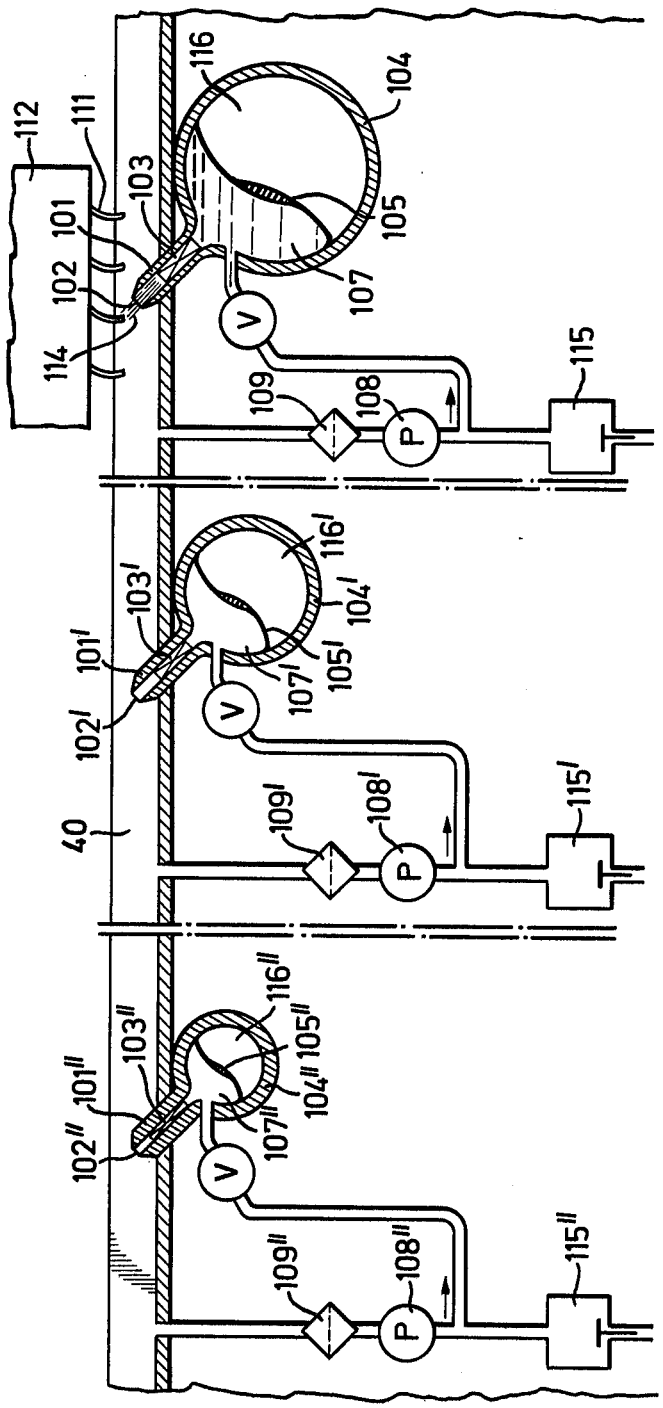
FIG. 8 shows diagrammatically in cross-section, propulsion apparatus according to the invention.

FIG. 8 shows propulsion nozzles 101, 101', 101", which are connected, via valves 103, 103', 103" to pressure containers. Elastic diaphragms 105, 105', 105" are situated inside the pressure containers. Water is conveyed into the upper spaces 107, 107', 107" at the pressure tank 104, 104', 104" by pressure pumps 108, 108', 108" through a filter 100, 100', 100". Pressure water can also be fed into the water spaces 107, 107', 107" via the check valves 115, 115', 115", whereby the compressed gas in the gas spaces 116, 116', 116" is compressed. Underneath the vehicle 112 buckets 111, 111', 111" are arranged which transmit the momentum of the emerging water jet 114, 114', 114" to the vehicle 112, 112', 112". A large number of these accelerating jets is distributed over the whole length of the acceleration path at distances which are smaller than the vehicle length. The pressure in the compressed gas cushions 116, 116', 116" becomes larger with increasing distance from the station and the outlet cross-sections 102, 102', 102" become correspondingly smaller. During the starting process, all the accumulators are discharged in sequence, i.e. the stored water is entirely expelled.

Figure 9:
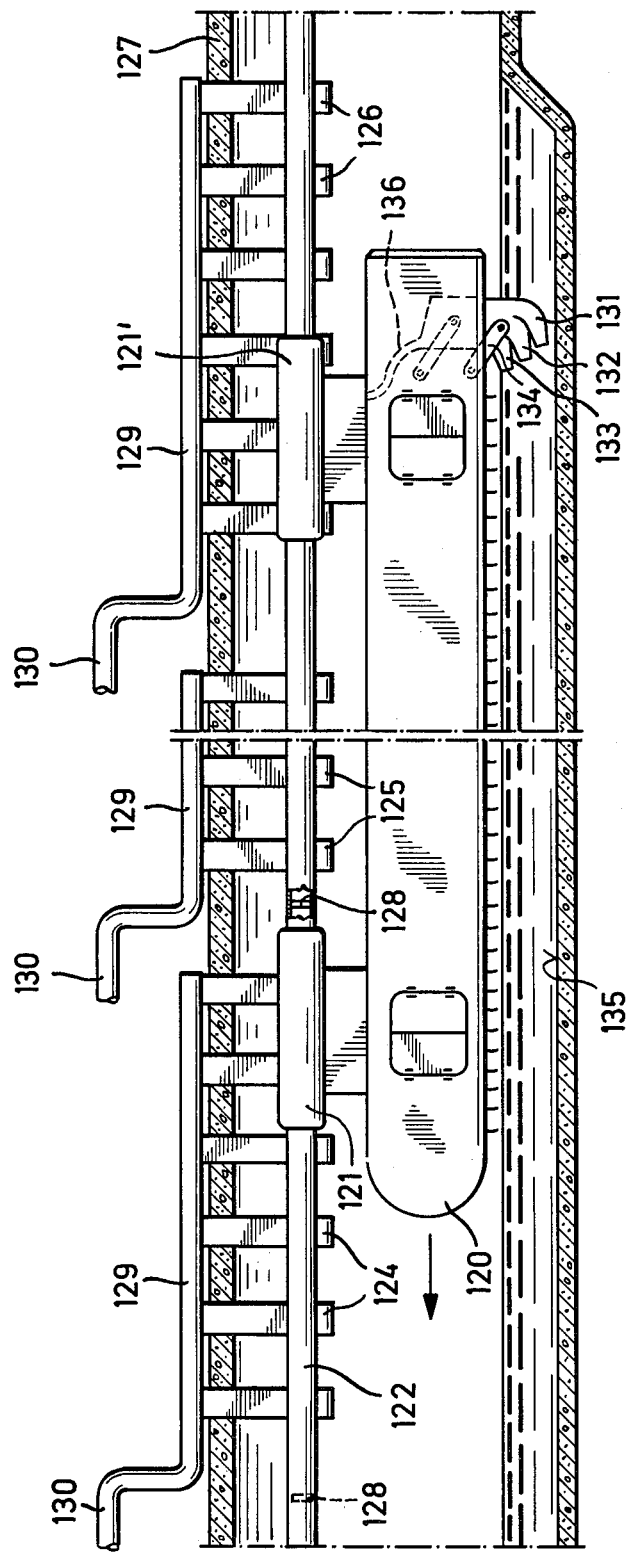
FIG. 9 shows diagrammatically a vehicle according to the invention at a station stop.

FIG. 9 shows a vehicle according to the invention. The cabin 120 is suspended for easy movement from skid shoes 121, 121' which envelop the guide rails 122. The cabin 120 has propulsion means (not shown), e.g. propulsion wheels, which roll along the guide rail 122, or else reaction nozzles, through which a backward facing jet can be discharged. The guide rail 122 is suspended on a large number of hook-shaped tubes 124, 125 and 126. The hook-shaped tubes are fixed in the concrete track tube 127 and not only support the tubular guide rail 122 but also serve as communicating ducts with the inside of the guide rail. After a specified number of hook-shaped tubes 124, 125 and 126, separating walls 128 are arranged inside the guide rail, which separate one communicating system of tubes 124, from the adjacent system of tubes 125. The hook-shaped tubes 124 to 126, communicate with a collector tube 129 which interconnects the hook-shaped tubes and via the connecting tubes 130, conveys the water back to the starting machinery. Tubular scoops 131, 132 and 133 are arranged in the travelling vehicle cabin. The scoops can be vertically displaced by means of a lever 134 and can also be retracted during high-speed travel.

Ahead of a station, a trough is arranged at the bottom of the concrete track tube 137 which is filled with water. As soon as the vehicle 120 reaches this water trough 135, the tubular scoop 131 is immersed underneath the water surface. Water pressure builds up through ram effect. The scooped up water is fed under pressure through the skid shoe 121', via the hose pipe 136, in which a check valve is arranged. This skid shoe has ports (not shown), which permit an entry of the pressure water into the tubular guide rail through ports in the guide rail 122 (not shown either). After a sufficient reduction in the travelling speed, the tubular scoops are moved further downwards and the tubular scoop 132 then becomes immersed below the water surface, too. Finally, at the end of the braking phase, the tubular scoop 133 is also immersed below the water surface. All the tubular scoops 131, 132 and 133 are connected to the skid shoe 121' via a check valve, so that water can flow into the skid shoe 121' via the hose pipe 136, but not in the reverse direction.

FIG. 10 shows, on a larger scale, the tubular scoops 131, 132 and 133 and hose pipe 136 leading upwards. The tubular scoops diverge into diffusers 139, in which the water velocity is reduced and the pressure is correspondingly increased.

FIG. 10a shows a vertical cross-section through the tubular guide rail. In this cross-section it can be seen that ports 140 and 141 are situated inside the tubular rail. Return flow is prevented by flap valves 142 and 143. The internal space of the tubular guide rail is connected to the hook-shaped tube 124, so that water entering inside the tubularrail, can be conducted away through this hook-shaped tube. Plastic bladders 144, filled with compressed gas, are situated inside the tubular rail and ensure that the water entering through the ports 140 and 141 does not lead to a sudden acceleration of the entire mass of water laying ahead in the tubular guide rail.

The pressure water then flows from the tubular guide rail into the hook-shaped tube 124 through the perforated bottom 145. After some distance of, for example, 100 m or even 200 m along the guide rail 122, a separating wall 146 is built into the rail, which separates sections with different pressures. The ducts 148 and 149 in the region 147 are shown in cross-section. This cross-section follows the section line A—A of FIG. 10b.

In FIG. 10b, the skid shoe 121 is shown in cross-section. This cross-section has three chambers 150, 151 and 152. Chamber 150 is filled with pressure water to produce lift in linear motion. Chamber 151 is also filled with water, though at a lower pressure, and serves purely for stabilisation and guidance, while chamber 152 communicates with the hose pipe 136. This hose pipe contains a check valve so that no water can flow in reverse through the tubular scoops 131, 132 and 133 even when these are not under pressure. The water now enters through the ports 148 into the tubular guide rail 122, then flows through the spring-loaded check valve 142. Thus, the water 153, situated inside the guide rail, cannot flow back into chamber 152. The hook-shaped tube 124 is of rectangular cross-section and is welded to the tubular guide rail 122. At its upper end, as shown in FIG. 9, the hook-shaped tube is fixed in the concrete track tube 127. Apart from supporting the guide rail 122, it conveys the water from inside the guide rail 122 along the arrow 154 into the connecting pipes 130, shown in FIG. 9, and, thus charges a pressure water accumulator for the next start. The bladder 144, containing the compressed gas is shown in cross-section.

Figure 11:
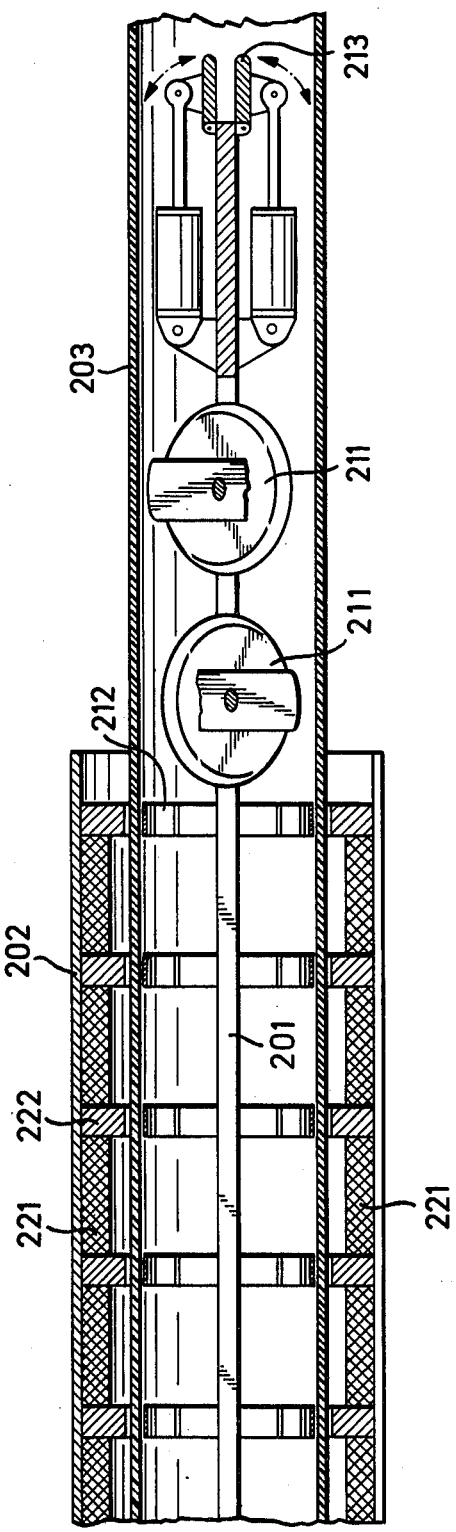
FIG. 11 shows diagrammatically a horizontal longitudinal cross-section through the rail and the magnetic system of a vehicle system according to the invention.

FIG. 11 shows a horizontal longitudinal cross-section through another type of guide rail and another propulsion system. The tubular guide rail 203 is made of a magnetically and electrically non-conducting material. Since the generation of magnetic shear forces requires an air gap of the order of several centimeters, the material for the guide rail can, for example, be glass-reinforced synthetic resin. A piston 201 is situated inside the guide rail and is guided at each end by two wheels 211, disposed at right angles to each other. The magnetic portion of the piston consists of flux conducting pieces 212 of magnetically soft iron, which may be built up of individual sheet metal strips. In this way, a stepped cross-section matching the circumference can be easily produced so that a uniform flux density can be achieved throughout the entire material.

Sealing elements 213 on both sides of the piston are designed as flaps hinged along the diameter. In motion, like the magnetically conducting pieces 212, the flaps, being in a folded condition, have a particularly low air drag. Thus, the additional air friction which might have been caused by an air column pushed ahead of the vehicle in the guide rail is avoided.

The guide rail 203 is surrounded by a sleeve 202 over a large part of its circumference for example 300° – 330° C. Permanent magnets 221 are situated in this sleeve, which are magnetised in the longitudinal direction and make up a magnetic loop via conducting iron pieces 222 and the conducting pieces 212 in the piston.

Figure 12:
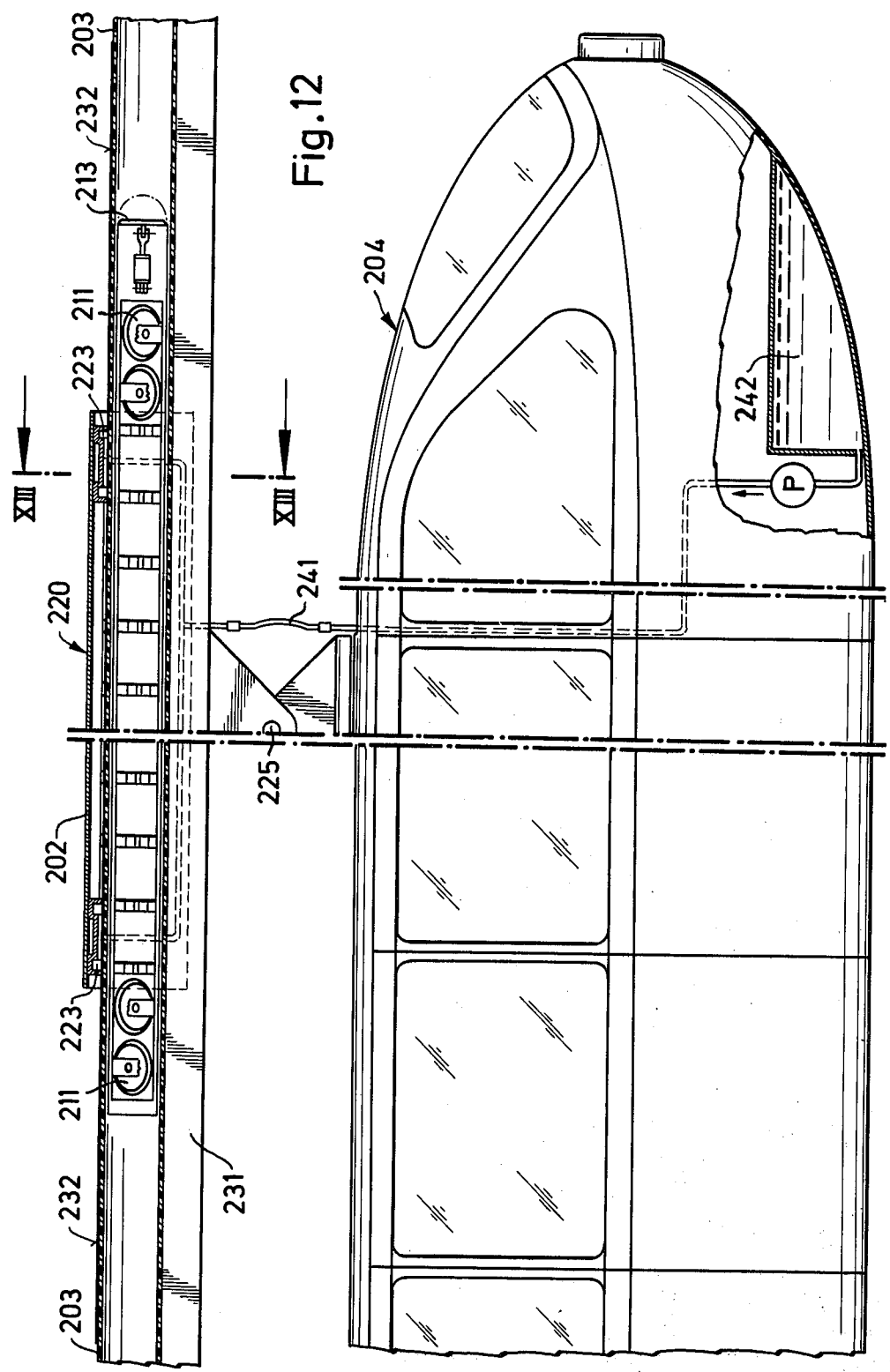
FIG. 12 shows a vertical longitudinal cross-section through this rail and the suspension of the vehicle.

FIG. 12 shows a vertical cross-section through the rail and the vehicle in this embodiment. The skid sleeve on which the vehicle is suspended carries one hydrostatic bearing 223 at each end.

Figure 13:
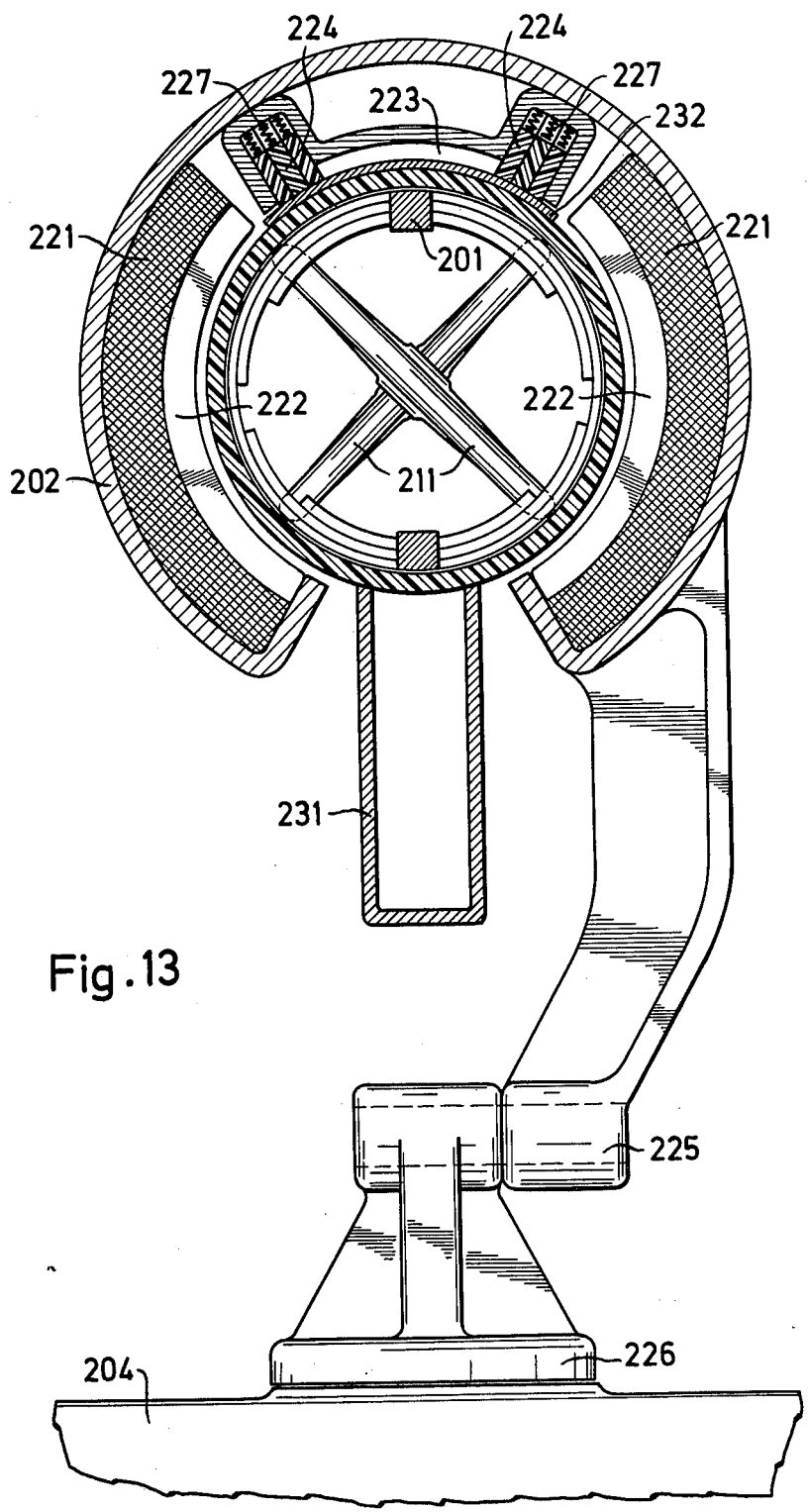
FIG. 13 shows a cross-section through this rail, the compressed air piston and the skid sleeve.

FIG. 13 shows a cross-section through FIG. 12 along the section line XIII—XIII. The guide rail 203 is supported by the rectangular-section tube 231 and is enveloped by a pincer shaped sleeve 202. The vehicle cabin 204 is suspended on the sleeve 202 via two hinged joints 225 and 226, pivoting about the transverse and vertical vehicle axes, respectively. The bearing 223 is open to the guide rail 203, which, in this region, carries a wear resistant sliding strip 232, preferably of hard-chromium-plated stainless steel. The bearing 223 carries sealing strips 224 laterally which are pressed by springs 227 against the sliding surface 232. In motion, a hydrodynamic film forms under the sealing strips 224 which leads to non-contact operation above a certain minimum speed. Pressure water is conveyed (see FIG. 12) from the container 242 via the pipeline 241, into the bearings 223. The water passing along the rail through the gap of the skid shoe bearings 223, is lost to the water circulation and must be replenished by occasional topping up of the container 242.

Figure 14:
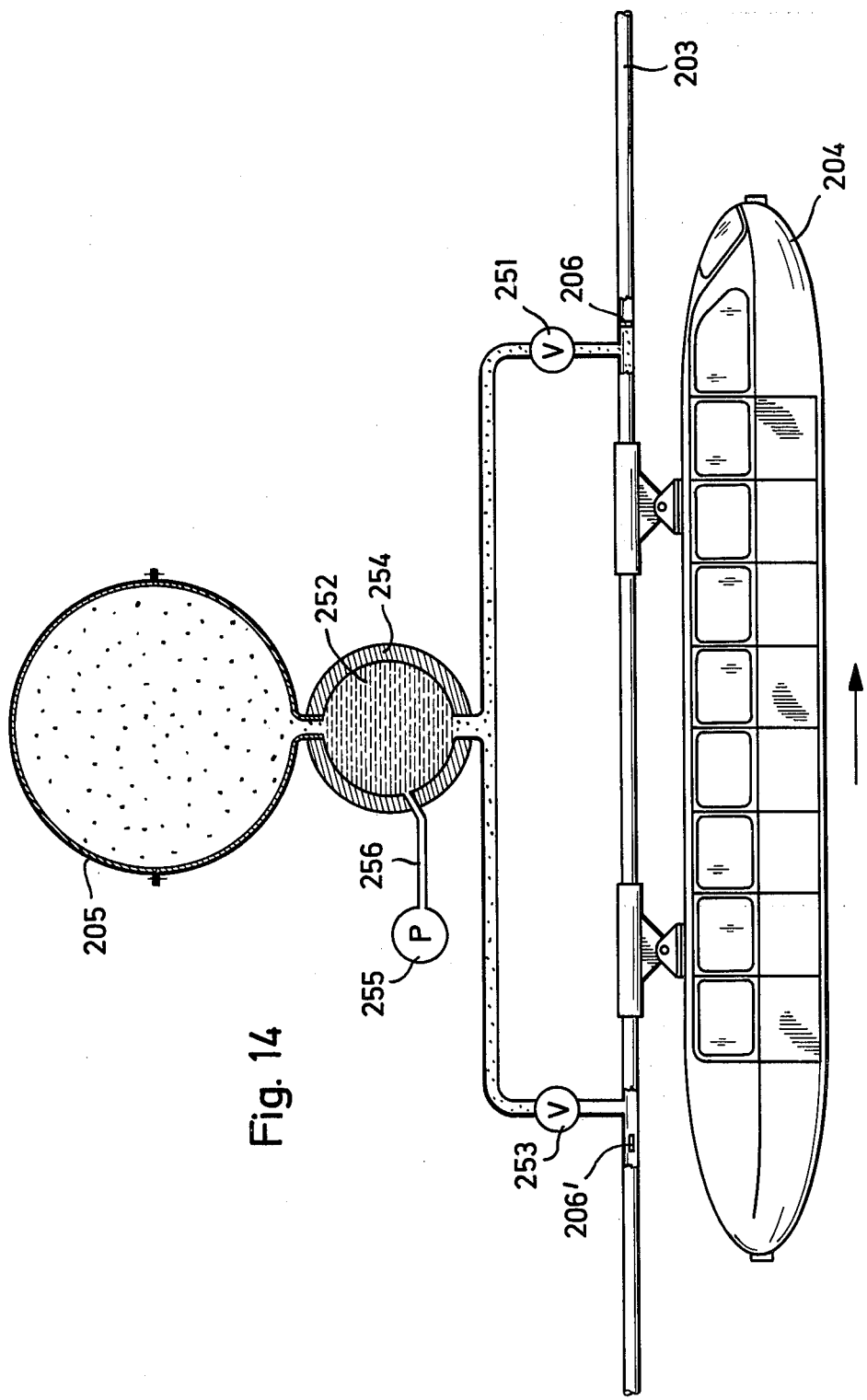
FIG. 14 shows the diagram of the pneumatic control of a vehicle at a stop.

FIG. 14 shows the pneumatic control circuit at a station. To start the braking process of the approaching vehicle, a gate valve 206 is inserted into the tubular guid rail 203 and the hinged flaps 213 in the front part of the piston are in the shut-off position. The air in front of the piston is progressively compressed which leads to a steady increase in deceleration. The region of the guide rail 203 which lies between the vehicle and the station is connected to a compressed air container 205 via a check valve 251. As soon as the pressure of the enclosed air column exceeds the pressure in the container, the check valve 251 opens and the compressed air flows into the compressed air container 205. The compressed air accumulator is thus charged by the braking energy. During this phase, the vehicle cabin is subject to braking at constant deceleration. The vehicle reaches its exact stopping position by the application of mechanical brakes along the last few meters. The mechanical brakes also prevent a reverse acceleration against the direction of travel. On the way to the compressed air accumulator, the compressed air transfers its thermal energy to a latent heat accumulator 252. This heat accumulator is small in relation to the compressed air container 205 and can, therefore, be provided with a high-grade thermal insulation 254.

To actuate the starting procedure, the gate valve 206 in the tubular guide rail is opened and the gate valve 206' is shut. The mechanical brakes are then disengaged and the valve 253 is opened. The air flowing from the compressed air container 205 into the tubular guide rail 203 withdraws the stored thermal energy from the latent heat accumulator. A compressed air container with a latent heat accumulator has very small losses only and thus functions like a spring. Such pressure accumulators with latent heat storage are not limited in their application to the main subject-matter of the invention. The unavoidable compressed air losses are compensated by a compressor 255 which may also supply further stations via small-bore pipelines 256.

FIGS. 15A to 15D show the design of a shut-off gate valve 206 in the tubular guide rail 203. This gate valve cannot occupy more than the width of the rectangular-section support tube 231. In the open position, the gate valve must fully expose the internal cross-sectional area of the guide rail. The gate valve consists, for example, of a circular flap 261, a piston rod 262 and compressed air cylinders 264 and 265. First, the flap 261 is rotated by 90° by means of the compressed air cylinder 264 operating through the toothed segment 266 and the rack 267. Only then is the flap retracted through a slot at the bottom of the guide rail by means of the compressed air cylinder 265. The piston rod 262 has a K-profile in cross-section, which provides not only guidance but also sealing against the cover of the cylinder 265. Seals 268 in the longitudinal direction of the piston rod prevent, when the gate valve is closed, outflow of the compressed air through the slot at the bottom of the guide rail. It is also possible to design a shut-off gate valve as a pair of flaps hinged along the diameter similar to the sealing elements of the vehicle piston. This flap is inserted in a folded condition into the tubular guide rail and then opened out.

I claim:

1. A rail vehicle having propulsive machinery arranged outside the vehicle and apparatus for transmitting propulsive momentum to the vehicle, characterized in that said apparatus acts on the vehicle only along the length of path necessary for the acceleration of the vehicle, in that the vehicle is supported by a tubular guide rail of a magnetically permeable material, in that a piston structurally connected to said vehicle and containing magnetic elements is slidable within said tubular guide rail to make a linear magnetic coupling with said guide rail, and in that compressed air is utilized to propel the piston during the acceleration phase of the vehicle and where the piston serves to compress air during the deceleration phase of the vehicle, which compressed air is later used to propel the vehicle.

2. A rail vehicle having propulsive machinery arranged outside the vehicle and apparatus for transmitting propulsive momentum to the vehicle, characterized in that the apparatus acts on the vehicle only along a length of path necessary for the acceleration of the vehicle, in that a water trough is located at each station stop for the vehicle, in that a scoop type diffuser is attached to the bottom of the vehicle which is adapted to be immersed into the water trough, in that a hollow storage container containing a gas communicates with the scoop whereby water scooped up by the diffuser from the water trough during a deceleration of the vehicle compresses the gas and in that means for regulating flow of water from said storage container containing the compressed gas is included to provide a controllable propulsive force to the vehicle.

3. A rail vehicle according to claim 2 wherein the hollow container is arranged inside the vehicle and further characterized in that a jet nozzle which communicates with the hollow container by way of a valve is arranged at the end of the vehicle and through which water may be ejected to provide an acceleration force to the vehicle.

4. A rail vehicle having propulsive machinery arranged outside the vehicle and apparatus for transmitting propulsive momentum to the vehicle, characterized in that the apparatus acts on the vehicle only along a length of path necessary for the acceleration of the vehicle, in that a water trough is located at each station stop for the vehicle, in that a scoop type diffuser is attached to the bottom of the vehicle and is adapted to be immersed into a water trough, in that a hollow storage container is positioned stationarily exterior of the vehicle and contains a gas with the container communicating with the scoop whereby water scooped up by the diffuser from a water trough during a deceleration of the vehicle compresses the gas, in that a tubular guide rail supports the vehicle where the interior of the guide rail communicates with said hollow container, and in that a skid shoe supporting said vehicle is slideable on said guide rail and connects the interior of the guide rail with the diffuser.

5. A rail vehicle according to claim 4 wherein the shoe contains a water filled chamber facing onto the surface of the guide rail.

6. A rail vehicle according to claim 5 wherein the chamber is surrounded in part by sealing elements which have grooves extending along lines diverging in the direction of vehicle travel.

7. A rail vehicle according to claim 5 wherein the guide rail comprises a tube positioned above the vehicle and in that the skid shoe has at least two chambers arranged symmetrically to the vertical diameter of the guide rail.

* * * * *